(12) United States Patent
Kang

(10) Patent No.: US 11,975,653 B2
(45) Date of Patent: May 7, 2024

(54) TARGET DETECTION SYSTEM AND METHOD FOR VEHICLE

(71) Applicant: HYUNDAI MOBIS Co., Ltd., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/890,639

(22) Filed: Aug. 18, 2022

(65) Prior Publication Data

US 2023/0119420 A1 Apr. 20, 2023

(30) Foreign Application Priority Data

Oct. 19, 2021 (KR) .................. 10-2021-0139451

(51) Int. Cl.
*B60Q 9/00* (2006.01)
*G06V 20/58* (2022.01)

(52) U.S. Cl.
CPC .......... *B60Q 9/008* (2013.01); *G06V 20/58* (2022.01); *G06V 2201/07* (2022.01)

(58) Field of Classification Search
CPC ..... B60Q 9/008; G06V 20/58; G06V 2201/07
USPC ......................................................... 340/435
See application file for complete search history.

(56) References Cited

U.S. PATENT DOCUMENTS

| | | | | |
|---|---|---|---|---|
| 8,427,340 B2 * | 4/2013 | Palmieri | ................ | G08G 1/168 340/901 |
| 9,174,672 B2 * | 11/2015 | Zeng | ..................... | G01S 13/931 |
| 2004/0178893 A1 * | 9/2004 | Litkouhi | .................. | H04R 5/02 340/435 |
| 2007/0165910 A1 * | 7/2007 | Nagaoka | ................. | G06T 7/136 382/104 |
| 2008/0273750 A1 * | 11/2008 | Fujimoto | ............... | G06V 40/10 348/148 |
| 2008/0291000 A1 * | 11/2008 | Kim | ...................... | G01S 7/4813 340/436 |

(Continued)

FOREIGN PATENT DOCUMENTS

KR       10-1521870 B1       5/2015

OTHER PUBLICATIONS

Extended European Search Report issued in corresponding European Patent Application No. 22185418.5 dated Feb. 20, 2023.

*Primary Examiner* — Kerri L McNally
*Assistant Examiner* — Thang D Tran
(74) *Attorney, Agent, or Firm* — MORGAN, LEWIS & BOCKIUS LLP

(57) ABSTRACT

In a case where a person moves away in a longitudinal direction from the vicinity of a vehicle, a condition for generating a warning is satisfied due to a change in a speed in a transverse direction. Thus, a warning system generates an erroneous warning. In order to solve this problem, there are proposed a target detection system for a vehicle and a target detection method for a vehicle, both of which are capable of computing a final risk level, taking into consideration not only results of recomputing a time-to-collision and an impact point, but also the presence or absence of a target that is detected by a camera sensor. The time-to-collision and the impact point are recomputed, taking into consideration a change in a speed in a transverse direction that occurs when the target moves in the longitudinal direction.

11 Claims, 7 Drawing Sheets

(56) References Cited

U.S. PATENT DOCUMENTS

| | | | |
|---|---|---|---|
| 2009/0045928 A1* | 2/2009 | Rao | B60Q 9/006 340/435 |
| 2011/0128136 A1* | 6/2011 | Katoh | G08G 1/164 340/435 |
| 2011/0246043 A1* | 10/2011 | Maruyama | G08G 1/166 701/96 |
| 2012/0025964 A1* | 2/2012 | Beggs | G08G 1/166 340/435 |
| 2012/0277957 A1* | 11/2012 | Inoue | B60W 30/12 701/41 |
| 2013/0027196 A1* | 1/2013 | Yankun | G06V 20/58 382/103 |
| 2013/0286205 A1* | 10/2013 | Okada | G06V 20/58 348/148 |
| 2015/0166062 A1* | 6/2015 | Johnson | G08G 1/167 701/41 |
| 2015/0232027 A1* | 8/2015 | Freitas | B60Q 9/008 340/435 |
| 2015/0266508 A1* | 9/2015 | Yoshihata | B62D 15/025 701/41 |
| 2015/0307024 A1* | 10/2015 | Fukuda | G06V 20/58 382/103 |
| 2018/0003505 A1* | 1/2018 | Tateishi | G01C 21/30 |
| 2018/0096604 A1* | 4/2018 | Morimura | G01S 13/867 |
| 2018/0137339 A1* | 5/2018 | Osato | G06V 20/58 |
| 2018/0215375 A1* | 8/2018 | Greene | G08G 1/168 |
| 2018/0370531 A1* | 12/2018 | Matsunaga | B60W 50/14 |
| 2019/0016316 A1* | 1/2019 | Sung | B60T 7/22 |
| 2019/0135306 A1* | 5/2019 | Won | G08G 1/167 |
| 2019/0361436 A1* | 11/2019 | Ueda | G08G 1/09 |
| 2020/0114886 A1* | 4/2020 | Kim | G08G 1/163 |
| 2020/0180553 A1* | 6/2020 | Kim | B60R 21/0132 |
| 2020/0234580 A1* | 7/2020 | Takada | G08G 1/096716 |
| 2020/0242374 A1* | 7/2020 | Nakazawa | B60R 11/04 |
| 2020/0298758 A1* | 9/2020 | Ardalkar | B60Q 9/008 |
| 2020/0386032 A1* | 12/2020 | Battlogg | B60N 2/002 |
| 2021/0009064 A1* | 1/2021 | Kim | B60Q 3/80 |
| 2021/0061281 A1* | 3/2021 | Niewiadomski | B60W 50/14 |
| 2021/0213918 A1* | 7/2021 | Chen | B60T 8/00 |
| 2021/0215808 A1* | 7/2021 | Abari | G01S 7/403 |
| 2021/0264174 A1* | 8/2021 | Ahn | G06V 20/58 |
| 2022/0118970 A1* | 4/2022 | Takaki | B60Q 1/535 |
| 2022/0176995 A1* | 6/2022 | Subramanian | B60W 50/14 |
| 2022/0314940 A1* | 10/2022 | Kim | B60W 30/18036 |
| 2022/0324442 A1* | 10/2022 | Ma | G05D 1/0214 |

\* cited by examiner

TARGET DETECTION SYSTEM AND METHOD FOR VEHICLE

CROSS REFERENCE TO RELATED APPLICATION

The present application claims priority of Korean Patent Application No. 10-2021-0139451 filed on Oct. 19, 2021, the entire contents of which is incorporated herein for all purposes by this reference.

BACKGROUND OF THE DISCLOSURE

Field of the Disclosure

The present disclosure relates to a target detection system for a vehicle and a target detection method for a vehicle and, particularly to, a target detection system for a vehicle and a target detection method for a vehicle, the system and the method being capable of improving an erroneous-warning situation that occurs due to an error in a speed in a transverse direction of a vehicle.

Description of the Related Art

A vehicle system for detecting a target refers to a system that detects a target approaching a blind spot of a user's vehicle and provides prior notice of the target's approaching. As a detection unit of the target detection system, a radar sensor or the like that uses a reflected wave may be used.

The principle of operation of a radar for a vehicle is to transmit a transmission electromagnetic wave signal from a user's vehicle, to receive an electromagnetic wave signal reflected from a different vehicle or an obstacle, and to estimate a distance or a relative speed between the radar and the different vehicle or the obstacle using a time difference between these two signals and an amount of change in Doppler frequency.

However, there may occur a problem in that an erroneous warning is generated as a result of erroneous detection due to a type of obstacle, a movement direction, or the like.

For example, while a person walks, various micro-Doppler effects occur due to movements of his/her head, shoulders, upper body, arms, and legs. That is, the micro-Doppler effects refer to additional Doppler shifts produced by other vibrations and rotations in the person's different portions in addition to the person's platform. The micro-Doppler effect is used when classifying types of targets. However, the micro-Doppler effect causes an error in estimating movement information of the target. The reason for this is because the acquisition of various pieces of detection information from one target causes differences in accuracies of a distance, a speed, and the like, depending on which of the various pieces of detection information is used as representative information. Moreover, because the target recognized as a person has a smaller Radar Cross Section (RCS) than a vehicle, a signal received after being reflected from the target has a small magnitude. Thus, an information error may be further increased.

Therefore, in a case where the person moves away in a longitudinal direction from a lateral surface of the vehicle, because a distance in a transverse direction between the vehicle and the person is short, in some cases, an erroneous warning is generated. More specifically, in a case where the person gets off a vehicle that stops adjacent to a user's vehicle and moves in the longitudinal direction away from the user's vehicle, an error in a speed in the transverse direction may occur due to a short distance in the transverse direction between the vehicle and the person and the micro-Doppler effect occurring while the person moves. In this case, a condition for generating the erroneous warning is satisfied due to the error of the speed in the transverse direction, and thus there occurs a problem in that a warning system generates the erroneous warning.

Therefore, there is a growing need for technology development to provide a method for improving an erroneous-warning situation that occurs due to the change in the speed in the transverse direction while the target moves in the longitudinal direction.

The foregoing is intended merely to aid in understanding the background of the present disclosure and therefore should not be interpreted to admit that the present disclosure falls within the purview of the related art that is already known to a person of ordinary skill in the art.

SUMMARY OF THE DISCLOSURE

An object of the present disclosure, which is proposed to solve the above-mentioned problem, is to provide a target detection system for a vehicle and a target detection method for a vehicle, both of which are capable of computing a final risk level, taking into consideration not only results of recomputing a time-to-collision and an impact point, but also the presence or absence of a target that is detected by a camera sensor 300. The time-to-collision and the impact point are recomputed, taking into consideration a change in a speed in a transverse direction that occurs when the target moves in a transverse direction.

In order to accomplish the above-mentioned object, according to an aspect of the present disclosure, there is provided a target detection system for a vehicle, the system including: a detection sensor detecting a target based on a reflected wave; a camera sensor monitoring the target based on an image; and a controller determining a first risk level of the target based on data acquired through the detection sensor and a change in a speed in a transverse direction of the target, determining a second risk level of the target based on data acquired through the camera sensor, and computing a final risk level based on both the first risk level and the second risk level.

In the system, in a case where the target is present within a threshold distance in the transverse direction, the controller may determine the first risk level based on the change in the speed in the transverse direction of the target.

In the system, the controller may compute a time-to-collision and an impact point, as factors for determining the first risk level, and, in a case where the change in the speed in the transverse direction occurs, the controller may recompute the time-to-collision and the impact point by adding the change in the speed in the transverse direction to the time-to-collision and the impact point.

In the system, the controller determines the first risk level as indicating "risk" or "safety," and, in a case where the recomputed time-to-collision is shorter than a threshold value and where the recomputed impact point falls within a threshold value range, the controller may determine the first risk level as indicating the "risk."

In the system, the controller may determine the second risk level as indicating the "risk" or the "safety" and may extract left and right sides of the image obtained by the camera sensor through monitoring, as a warning region, and, in a case where the target is present on the warning region, the controller may determine the second risk level as indicating the "risk." In the system, the controller may compute a value of an image change of the warning region and, when the value of the image change is equal to or higher than a threshold value, the controller may determine the second risk level as indicating the "risk."

In the system, the controller may determine the first risk level and the second risk level as indicating "risk" or "safety," in a case where the first risk level and the second risk level both indicate the risk, the controller may determine the final risk level as indicating the "risk," and, in a case where the first risk level and the second risk level both indicate the "safety," the controller may determine the final risk level as indicating the "safety."

In the system, in a case where only one of the first risk level and the second risk level indicates the "risk," the controller may determine the final risk level as "pending," and, in a case where the final risk level indicates the "pending," the controller may delay generation of a warning, and, when the generation of the warning is delayed for a predetermined time or longer, may generate the warning.

According to another aspect of the present disclosure, there is provided a target detection method for a vehicle, the method including: detecting, by a detection sensor, a target based on a reflected wave; determining, by a controller, a first risk level of the target, taking into consideration data acquired through the detection sensor and a change in a speed of the target in a transverse direction; determining, the controller, a second risk level of the target based on data acquired through a camera sensor; and computing, the controller, a final risk level of the target based on both the first risk level and second risk level.

According to the present disclosure, even in a case where an error may occur in computing a risk level due to a change in a speed in a transverse direction while a detected target moves in a longitudinal direction, a more precise final risk level can be computed, taking into consideration not only results of both results of recomputing a time-to-collision and an impact point, but also the presence or absence of a target that is detected by a camera sensor. The time-to-collision and the impact point are recomputed, taking into consideration a change in a speed in a transverse direction.

BRIEF DESCRIPTION OF THE DRAWINGS

The above and other objects, features and other advantages of the present disclosure will be clearly understood from the following detailed description when taken in conjunction with the accompanying drawings, in which.

DETAILED DESCRIPTION OF THE DISCLOSURE

Figure 1:
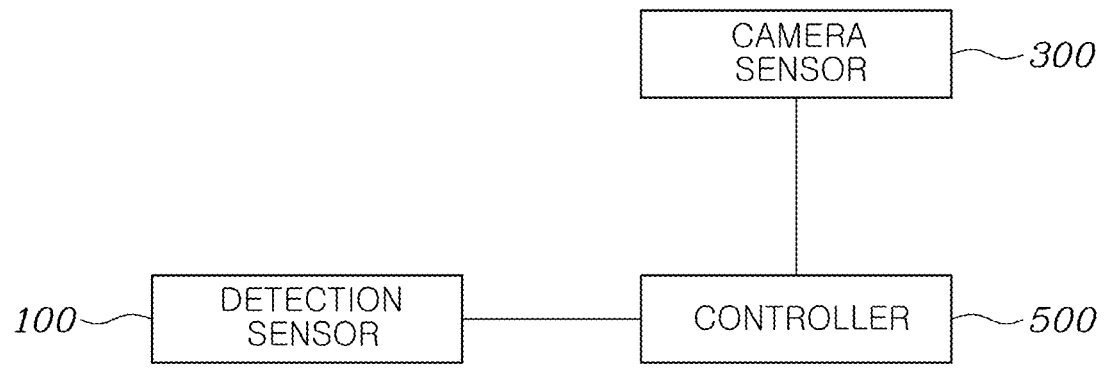
FIG. 1 is a block diagram illustrating a target detection system for a vehicle according to a first embodiment of the present disclosure.
Figure 2:
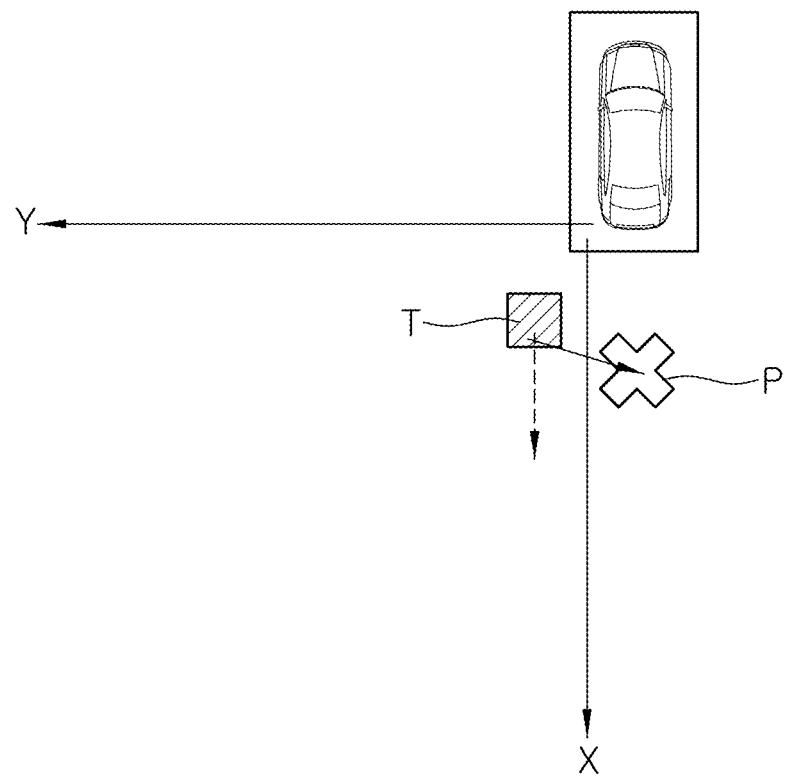
FIG. 2 is a view illustrating a situation where an erroneous warning occurs due to a change in a speed in a transverse direction of a target.
Figure 3:
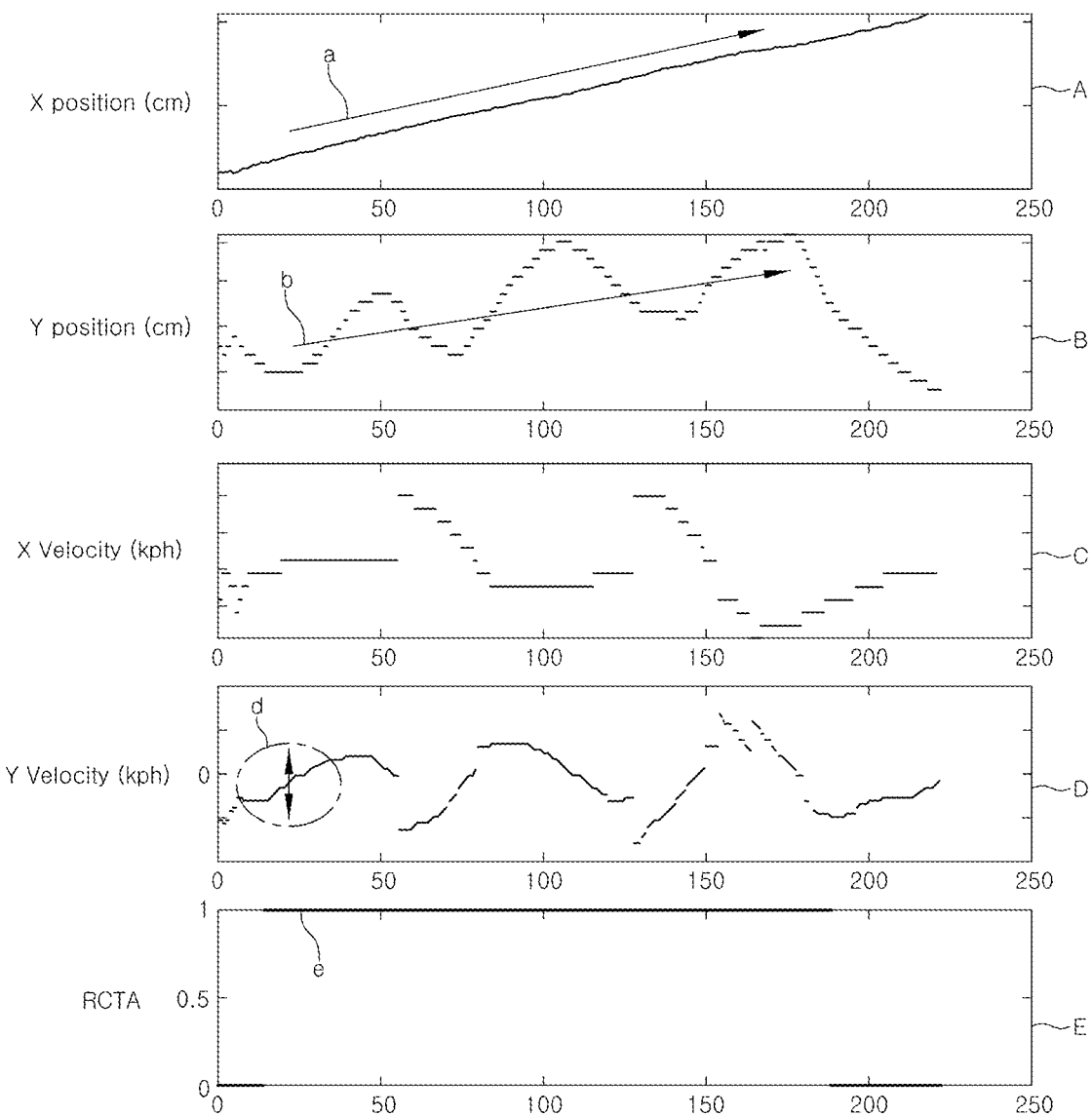
FIG. 3 are graphs showing information for tracking the target that moves away in a longitudinal direction, the information being acquired through measurement by a detection sensor.
Figure 4:
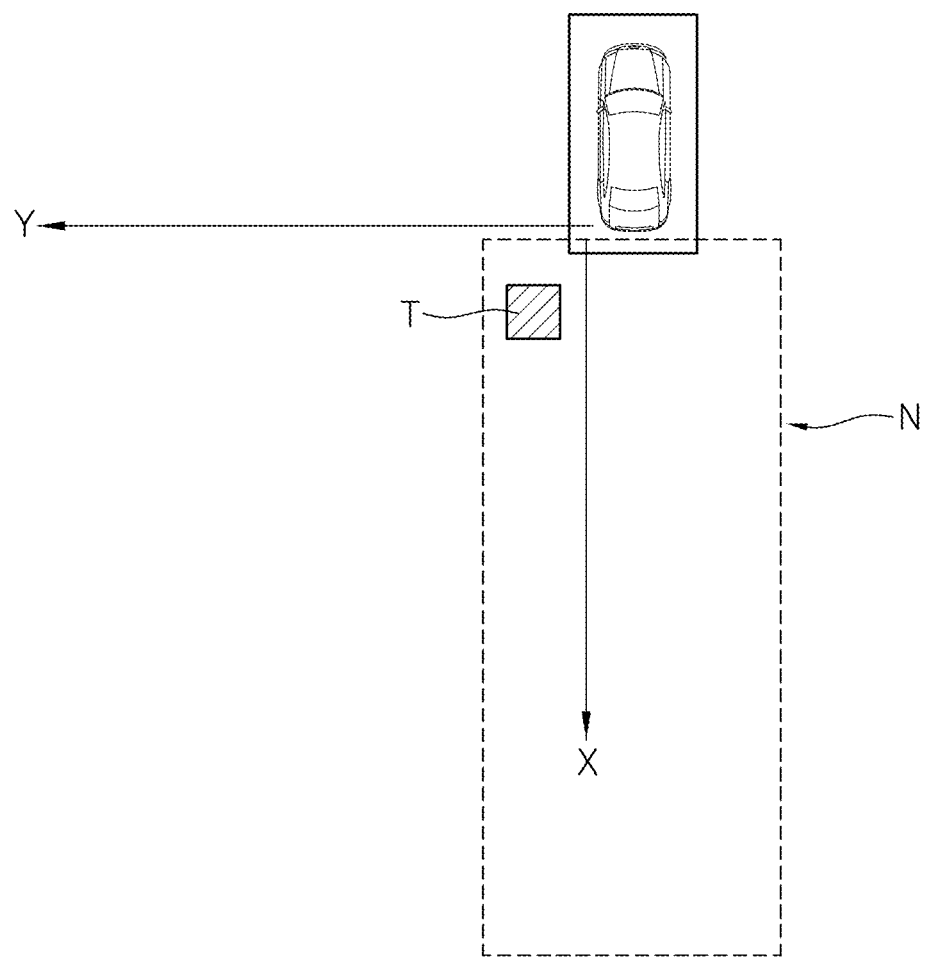
FIG. 4 is a view illustrating a situation where the target is positioned at a short distance.
Figure 5:
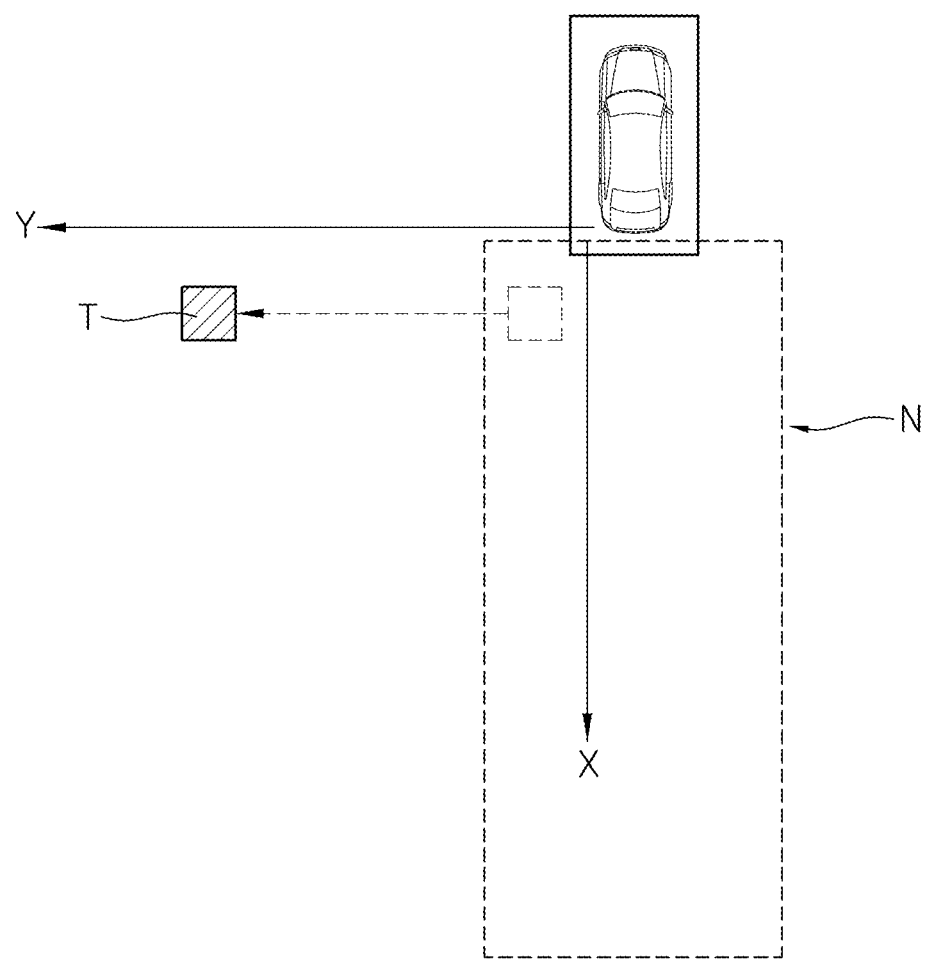
FIG. 5 is a view illustrating a situation where the target is positioned more than a threshold distance in the transverse direction away from the short distance.
Figure 6:
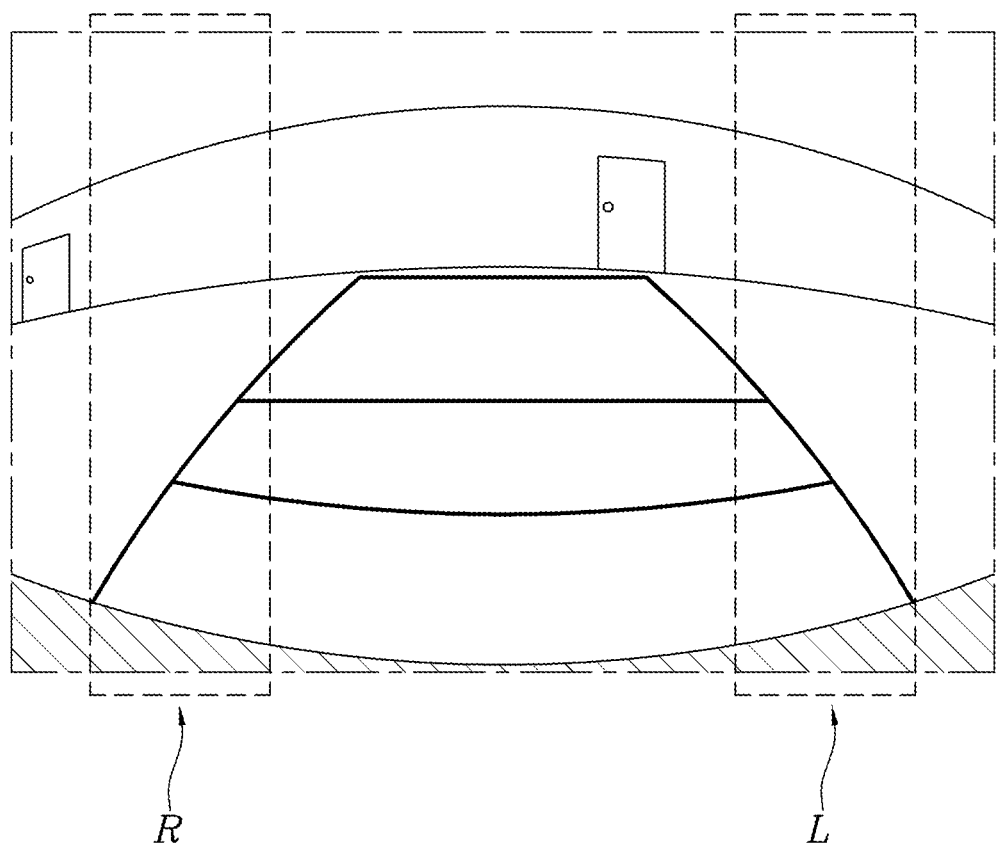
FIG. 6 is a view illustrating warning regions that are detectable by a camera sensor.
Figure 7:
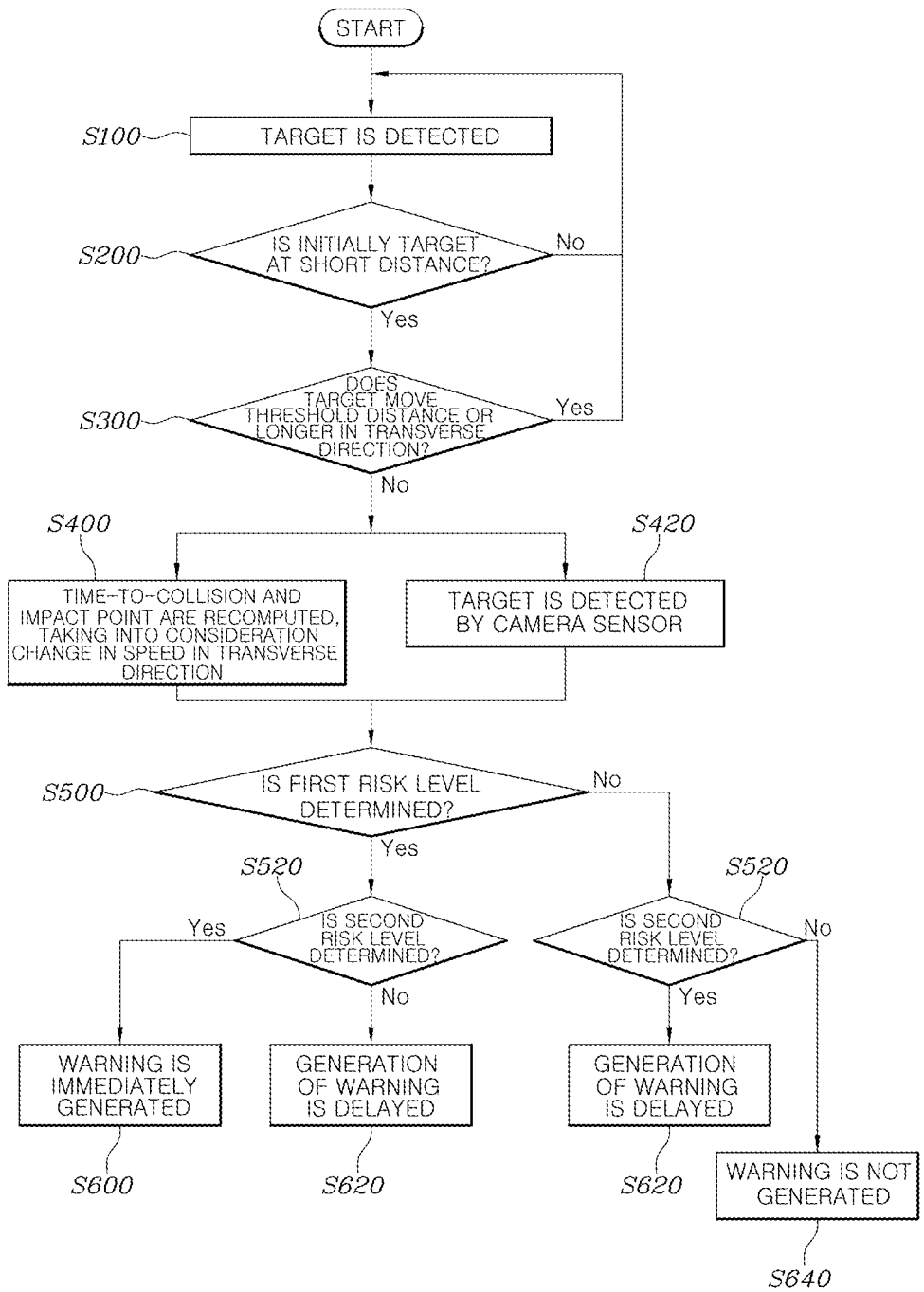
FIG. 7 is a flowchart illustrating a target detection method for a vehicle according to a second embodiment of the present disclosure.

FIG. 1 is a block diagram illustrating a target detection system for a vehicle according to a first embodiment of the present disclosure. FIG. 2 is a view illustrating a situation where, even though a target moves in a longitudinal direction, an erroneous warning occurs due to a change in a speed in a transverse direction of a target. FIG. 3 are graphs showing positions in the longitudinal and transverse directions and a speed that are measured by a detection sensor 100 and that are information for tracking the target that moves away in the longitudinal direction and showing generation of the erroneous warning. FIG. 4 is a view illustrating a situation where the target is positioned at a short distance. FIG. 5 is a view illustrating a situation where the target is positioned more than a threshold distance in the transverse direction away from the short distance. FIG. 6 is a view illustrating warning regions that appear to the left side and right side, respectively, of a vehicle, the warning regions being detectable by a camera sensor 300. FIG. 7 is a flowchart illustrating a target detection method for a vehicle according to a second embodiment of the present disclosure.

FIG. 1 is the diagram illustrating the target detection system for a vehicle according to the first embodiment of the present disclosure.

The target detection system for a vehicle according to the present disclosure is configured to include the detection sensor 100, the camera sensor 300, and a controller 500. The detection sensor 100 detects the target using a reflected wave. The camera sensor 300 detects the target using an image. The controller 500 computes a risk level through data acquired through the detection sensor 100 and the camera sensor 300.

The controller 500 according to an exemplary embodiment of the present disclosure may be realized through a nonvolatile memory (not illustrated) and a processor (not illustrated). The nonvolatile memory is configured to store data associated with algorithms for controlling operations of various components of the vehicle or with data as to software commands for executing the algorithms. The processor is configured to perform operations described below using the data stored in the nonvolatile memory. The memory and the processor here may be realized as individual chips, respectively. Alternatively, the memory and the processor may be realized as a single integrated chip. The processor may be a single processor or a combination of two or more processors.

The detection sensor 100 is a sensor that is capable of detecting tracking information (a distance, a speed, an azimuth angle, and the like) of the target on the basis of the reflected wave. The detection sensor 100 may be installed on at least one of the front side, rear, and flank of the vehicle. As an implementation example, the detection sensor 100 may generate the tracking information using the Doppler Effect. Furthermore, a Micro-Doppler effect may be used. The detection sensor 100 may be a radar, an ultrasonic sensor, a rider sensor, or the like that uses the reflected wave.

The camera sensor 300 may be installed on at least one of the front, rear, and flank of the vehicle. The camera sensor 300 may acquire image data on the vicinity of the vehicle. As an implementation example, the camera sensor 300 may obtain, through monitoring, an image that includes the warning region that appears to the right side or left side of the vehicle.

The controller 500 may determine a first risk level through the data acquired through the detection sensor 100. The data here acquired by the detection sensor 100 may be the tracking information of the target, such as the distance, the speed, and the azimuth angle. The controller 500 may compute a time-to-collision (TTC) and an impact point, as factors for determining the first risk level. At this point, the controller 500 may compute the TTC and the impact point using a position and a speed in the longitudinal direction and a position and a speed in the transverse direction. Moreover, even though the target moves in the longitudinal direction, in a case where the change in the speed in the transverse direction occurs, the controller 500 may determine the first risk level, taking this change into consideration. In this case, the TTC and the impact point are recomputed by adding the change in the speed in the transverse direction to values, respectively, that result from computing the TTC and the impact point.

The controller 500 determines the first risk level as "risk" or "safety." At this point, in a case where the recomputed TTC is shorter than a threshold value of the TTC and where the recomputed impact point falls within a threshold value range for the impact point, the first risk level is determined as indicating "risk." In other cases, the first risk level is determined as indicating "safety." That is, although the change in the speed in the transverse direction is considered, in a case where the TTC is short and where the impact point is close to the vehicle, the first risk level is determined as indicating the "risk" in such a manner that a warning is generated.

The camera sensor 300 may obtain an image through monitoring and thus may detect a target. The camera sensor 300 may be a sensor that is capable of acquiring an RGB image. The controller 500 may determine a second risk level, depending on whether or not the target is detected from the image obtained through the monitoring by the camera sensor 300. Like the first risk level, the second risk level may be determined as indicating the "risk" or the "safety."

In addition, the controller 500 may extract portions of the left side and right side of the image obtained through monitoring, as the warning regions, from the image. There is a high likelihood that the target detected by the detection sensor 100 will be extracted from the left side and right side of the image obtained by the camera sensor 300. Because of this, the controller 500 may regard the portions of the left side and right side of the image as the warning regions and thus may determine the second risk level. Therefore, in a case where the target is present in the portions extracted as the warning regions, the controller 500 determines the second risk level as "risk." At this point, in a case where an image change of the warning region occurs, the controller 500 may determine that the target is present. More specifically, when a value of the image change of the warning region is computed and the value of the image change is equal to or higher than a threshold value, the target may be determined as being present, and thus the second risk level may be determined as indicating the "risk."

The controller 500 determines a final risk level, taking into consideration the first risk level and the second risk level. In a case where the first risk level and the second risk level both indicate the "risk," the final risk level is determined as indicating the "risk." In a case where the first risk level and the second risk level both indicate the "safety," the final risk level is determined as indicating the "safety." In a case where the final risk level is the "risk," the warning is generated. In a case where the final risk level is "safety," the warning is not generated.

In a case where one of the first risk level and the second risk level indicates the "risk," the final risk level determined as indicating "pending." As an implementation example, in a case where the first risk level indicates the "risk" and where the second risk level indicates the "safety," or in a case where the first risk level indicates the "safety" and where the second risk level indicates the "risk," the final risk level may be determined as indicating the "pending."

In a case where the final risk level indicates "pending," the generation of the warning is delayed. At this point, when the generation of the warning is delayed for a predetermined time or longer, the warning may be generated. The reason for this is to alert a driver to a situation that a collision will occur at only one of the first risk level and the second risk level. In addition, as an implementation example, even after the final risk level is determined as indicating the "pending," because the first and second risk levels continue to be determined, the final risk level may change to the "risk." In this case, when the generation of the warning is delayed for less than the predetermined time, the warning may be generated.

As an implementation example, the final risk level may be determined as indicating being "high," "middle," or "low." In a case where the first risk level and the second risk level both indicate the "risk," the final risk level is determined as being "high." In a case where one of the first risk level and the second risk level both indicates the "risk," the final risk level is determined as being "middle." In a case where the first risk level and the second risk level both indicate the "safety," the final risk level is determined as being "low." At this point, in a case where the final risk level is determined as being "middle," the generation of the warning is delayed.

FIG. 2 is a view illustrating a situation where an erroneous warning occurs because a detected speed and direction change due to a change in a speed in a transverse direction Y even though a target T moves at an actual speed of a target T in a longitudinal direction X. The target T may undergo the change in the speed in the transverse direction Y even through a direction in which the target T actually moves is the longitudinal direction X in which a user's vehicle moves. As an implementation example, in a case where the target T is a person who moves in the longitudinal direction X, the micro-Doppler effect occurs in various portions of his/her body, thereby causing the change in the speed in the transverse direction Y. This change causes changes in the speed and direction that are detected by the sensor of the vehicle. Thus, it is erroneously determined that the target T moves toward a point P that the vehicle approaches. Thus, the erroneous warning is caused to be generated.

FIG. 3 are graphs showing the information for tracking the target T in a case where the target T detected by the detection sensor 100 moves away in the transverse direction X. Specifically, Graph A shows a change in movement distance of the target T in the longitudinal direction X over time, and a indicates that the movement distance in the longitudinal direction X increases. Graph B shows a change in movement distance of the target T in the transverse direction Y over time, and b indicates that, while the target T moves away, the movement distance of the target T in the transverse direction Y alternately increases and decreases. Graph C shows a change in a speed in the longitudinal direction X over time. Graph D shows a change in a speed in the transverse direction Y over time. d indicates that, even though the target T moves in the longitudinal direction X, the target T undergoes the change in the speed in the transverse direction Y. Graph E shows that, even though the target T moves away in the longitudinal direction X, Rear Cross Traffic Alert (RCTA) generates the erroneous warning e due to the change in the speed in the transverse direction Y.

FIG. 4 is a view illustrating a situation where the target T is positioned at a short distance. More specifically, in a case where the target T is present within a short-distance range N away from the user's vehicle, it is determined that the target T is at the short distance. In a case where the target T is present within the short-distance range N, the controller 500 may start to determine the first risk level. At this time, the first risk level and the second risk level may be determined at the same time. As an implementation example, the short-distance range N may be a range of impact points, and, specifically, the short distance may fall within the threshold value range for the impact point.

FIG. 5 is a view illustrating a situation where the target T is positioned more than the threshold distance in the transverse direction Y away from the short distance. As an implementation example, although the target T is initially present within the short distance range T, in a case where the target T thereafter moves out of the short-distance range N, the controller 500 does not determine the risk level. The reason for this is because if the user's vehicle is no longer at the short distance, there is a low likelihood that a collision risk will occur. At this point, the movement distance that is out of the short-distance range N in the transverse direction Y may be a threshold distance in the transverse direction Y. Therefore, although the target T is initially positioned within the short-distance range N, in a case where the target thereafter moves the threshold distance or longer in the transverse direction Y, the risk level is not determined.

FIG. 6 is a view illustrating the warning regions that may be detected by the camera sensor 300. The camera sensor 300 obtains an image through monitoring and thus detects the target. The camera sensor 300 may be installed on at least one of the front, rear, and flank of the vehicle. The controller 500 may extract portions of regions that appear to the right side R and left side L, respectively, of the vehicle, as the warning regions, from the image obtained through monitoring. On the basis of the value of the image change of the extracted warning region, the controller 500 may determine whether or not the target T is present. More specifically, when the value of the image change of the warning region is computed and the value of the image change is equal to or higher than the threshold value, the target may be determined as being present, and thus the second risk level may be determined as indicating the "risk." As an implementation example, in a case where the camera sensor 300 is installed on the rear of the vehicle, the controller 500 may extract the warning region including a parking guidance line, and in this case, the right side R and left side L of the parking guidance line may be the warning regions.

FIG. 7 is the flowchart illustrating the target detection method for a vehicle according to the second embodiment of the present disclosure.

With reference to FIG. 7, the method includes: a step of detecting, by a detection sensor 100, a target using a reflected wave (S100); a step of determining, by a controller 500, a first risk level of the target, taking into consideration data acquired through the detection sensor 100 and a change in a speed in a transverse direction of the target; a step of determining, the controller 500, a second risk level of the target through data acquired through a camera sensor 300; and a step of computing, the controller 500, a final risk level of the target, taking into consideration both the first risk level and second risk level.

More particularly, in a case where the detection sensor 100 detects the target, it is determined whether or not the target is initially positioned at a short distance away from a vehicle (S200). In a case where the target is not positioned at the short distance, the target may be continuously detected without determining a risk level. Although the target is positioned at the short distance from the vehicle, in a case where the vehicle is thereafter out of a short-distance range N, the risk level is not determined. That is, although the target is initially positioned at the short distance, in a case where the vehicle thereafter moves a threshold distance or longer in the transverse direction (S300), the risk level is not determined.

In a case where the target is present within the short-distance range N, the controller 500 computes a TTC and an impact point on the basis of the data obtained through the detection. At this point, in a case where the target undergoes the change in the speed in the transverse direction, the controller 500 recomputes the TTC and the impact point, taking into consideration the change in the speed in the transverse direction (S400). That is, the TTC and the impact point are recomputed by adding the change in the speed in the transverse direction to data on the computed TTC and impact point. Then, the controller 500 determines the first risk level on the basis of the recomputed TTC and impact point (S500). At this point, the camera sensor 300 may monitor whether or not the target is present (S420), and the controller 500 may determine the second risk level using the data acquired through the camera sensor 300. As an implementation example, in a case where the first risk level indicates the "risk," then, the second risk level may be determined (S520), and the first risk level and the second risk level may be determined at the same time (520).

The controller 500 computes a final risk level, taking into consideration both the first risk level and the second risk level. As an implementation example, in a case where the first risk level and the second risk level both indicate the "risk," the final risk level is determined as indicating the "risk," and generates a warning (S600). Furthermore, in a case where the first risk level and the second risk level both indicate the "safety," the final risk level is determined as indicating the "safety." Thus, the warning is not generated (S640). In a case where only one of the first risk level and the second risk level indicates the "risk," the final risk level is determined as indicating the "pending," and the generation of the warning is delayed. That is, in a case where the final risk level indicates the "pending," even though any one of the first risk level and the second risk level indicates the "risk," the generation of the warning is preferentially suppressed (S620). When the generation of the warning is delayed for a predetermined time or longer, the warning may be generated.

The specific embodiment of the present disclosure is described above with every feature thereof being illustrated in the drawings, and it would be obvious to a person of ordinary skill in the art that various modifications and alterations are possibly made to the present disclosure without departing from the technical idea of the present disclosure that is protected by the following claims.

What is claimed is:
1. A target detection system for a vehicle, the system comprising:

a detection sensor detecting a target based on a wave reflected from the target;

a camera sensor monitoring the target based on an image including the target; and in a first case where the target is away from a travel path of the vehicle and is present within a threshold distance from a lateral surface of the vehicle in a transverse direction of the vehicle, a controller determining a first risk level of the target based on data acquired through the detection sensor and a change in a speed of the target in the traverse direction, determining a second risk level of the target based on data acquired through the camera sensor, and computing a final risk level based on both the first risk level and the second risk level, wherein the controller determines the first risk level and the second risk level as indicating risk or safety, wherein, in a second case where the first risk level and the second risk level both indicate the risk, the controller determines the final risk level as indicating the risk, wherein, in a third case where the first risk level and the second risk level both indicate the safety, the controller determines the final risk level as indicating the safety, wherein, in a fourth case where only one of the first risk level and the second risk level indicates the risk, the controller determines the final risk level as pending, and wherein, in a fifth case where the final risk level indicates the pending, the controller delays generation of a warning, and, when the generation of the warning is delayed for a predetermined time or longer, generates the warning.

2. The system of claim 1, wherein in the first case where the target is away from the travel path of the vehicle and is present within the threshold distance in the transverse direction, the controller determines the first risk level based on the change in the speed in the transverse direction of the target.

3. The system of claim 1, wherein the controller computes a time-to-collision and an impact point, as factors for determining the first risk level, and wherein, in a sixth case where the change in the speed in the transverse direction occurs, the controller recomputes the time-to-collision and the impact point by adding the change in the speed in the transverse direction to the time-to-collision and the impact point.

4. The system of claim 3, wherein the controller determines the first risk level as indicating risk or safety, and wherein, in a seventh case where the recomputed time-to-collision is shorter than a first threshold value and where the recomputed impact point falls within a second threshold value, the controller determines the first risk level as indicating the risk.

5. The system of claim 1, wherein the controller determines the second risk level as indicating risk or safety and extracts left and right sides of the image obtained by the camera sensor through monitoring, as a warning region, and wherein, in an eighth case where the target is present on the warning region, the controller determines the second risk level as indicating the risk.

6. The system of claim 5, wherein the controller computes a value of an image change of the warning region, and wherein, when the value of the image change is equal to or higher than a threshold value, the controller determines the second risk level as indicating the risk.

7. A target detection method for a vehicle, the method comprising:

detecting, by a detection sensor, a target based on a reflected wave;

in a first case where the target is away from a travel path of the vehicle and is present within a threshold distance from a lateral surface of the vehicle in a transverse direction of the vehicle, determining, by a controller, a first risk level of the target based on data acquired through the detection sensor and a change in a speed of the target in the transverse direction;

determining, by the controller, a second risk level of the target based on data acquired through a camera sensor; and computing, by the controller, a final risk level of the target based on both the first risk level and second risk level, wherein in the computing of the final risk level, the first risk level and the second risk level are determined as indicating risk or safety, wherein, in a second case where the first risk level and the second risk level both indicate the risk, the final risk level is determined as indicating the risk, wherein, in a third case where the first risk level and the second risk level both indicate the safety, the final risk level is determined as indicating the safety, wherein in the computing of the final risk level, in a fourth case where only one of the first risk level and the second risk level indicates the risk, the final risk level is determined as pending, and wherein, in a fifth case where the final risk level indicates the pending, generation of a warning is delayed, and, when the generation of the warning is delayed for a predetermined time or longer, the warning is generated.

8. The method of claim 7, wherein in the determining of the first risk level, in the first case where the target is away from the travel path of the vehicle and is present within the threshold distance in the transverse direction, the first risk level is determined based on the change in the speed in the transverse direction of the target.

9. The method of claim 7, wherein in the determining of the first risk level, a time-to-collision and an impact point are computed as factors for determining the first risk level, and wherein, in a sixth case where the change in the speed in the transverse direction occurs, the time-to-collision and the impact point are recomputed by adding the change in the speed in the transverse direction to the time-to-collision and the impact point.

10. The method of claim 9, wherein in the determining of the first risk level, the first risk level is determined as indicating risk or safety, and wherein, in a seventh case where the recomputed time-to-collision is shorter than a first threshold value and where the recomputed impact point falls within a second threshold value range, the first risk level is determined as indicating the risk.

11. The method of claim 7, wherein in the determining of the second risk level, the second risk level is determined as indicating risk or safety and left and right sides of the image obtained by the camera sensor through monitoring are extracted as a warning region, and a value of an image change of the warning region is computed, and wherein, in an eighth case where the value of the image change of the warning region is equal to or higher than a threshold value, the second risk level is determined as indicating the risk.

\* \* \* \* \*